(12) United States Patent
Chu et al.

(10) Patent No.: US 7,523,179 B1
(45) Date of Patent: Apr. 21, 2009

(54) SYSTEM AND METHOD FOR CONDUCTING DIRECT DATA PLACEMENT (DDP) USING A TOE (TCP OFFLOAD ENGINE) CAPABLE NETWORK INTERFACE CARD

(75) Inventors: Hsiao-Keng J. Chu, Palo Alto, CA (US); Sunay Tripathi, San Jose, CA (US); Erik Nordmark, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 875 days.

(21) Appl. No.: 11/011,076

(22) Filed: Dec. 14, 2004

(51) Int. Cl.
*G06F 15/177* (2006.01)

(52) U.S. Cl. ............... 709/222; 709/223; 709/249; 709/250; 713/1; 370/395.72

(58) Field of Classification Search ........... 709/222, 709/223, 249, 250; 713/1; 370/395.72
See application file for complete search history.

(56) References Cited

U.S. PATENT DOCUMENTS 6,981,036 B1 * 12/2005 Hamada ............... 709/223

2005/0198400 A1 * 9/2005 Minturn ............... 709/250

* cited by examiner

*Primary Examiner*—Jinsong Hu
(74) *Attorney, Agent, or Firm*—Osha • Liang LLP

(57) ABSTRACT

Techniques, systems, and apparatus for conducting direct data placement of network message data to a final destination in a user buffer are disclosed. Generally, the invention is configured to conduct direct data copying from a NIC memory to a final destination user buffer location without any intermediate copying to a kernel buffer. The invention includes a method that involves receiving network delivered messages by a NIC of a local computer. The message is stored in the memory of the NIC. The headers are stripped from the message and processed. A ULP handler of the local computer is invoked to process the ULP header of the network message. Using information obtained from the processed ULP header, suitable memory locations in a user buffer are identified and designated for saving associated message data. The message data is then directly placed from the NIC memory to the designated memory location in the user buffer without intermediate copy steps like DMA.

16 Claims, 3 Drawing Sheets

SYSTEM AND METHOD FOR CONDUCTING DIRECT DATA PLACEMENT (DDP) USING A TOE (TCP OFFLOAD ENGINE) CAPABLE NETWORK INTERFACE CARD

BACKGROUND OF THE INVENTION

Conventionally constructed computer systems include a network processing layer as part of the kernel to facilitate the transmission and receipt of data over a networked system. Network Interface Cards (NIC's) are commonly used to enable computers to be connected with other systems in a network.

Commonly, when message packets arrive at a receiving computer system they are processed by the network processing stack of the kernel (e.g., the network protocol stack (also referred to as the TCP/IP stack) and the upper layer protocol layer (the ULP layer). With the steadily increasing capabilities of modern NIC's, throughput of on the order of 1 Gb/s (gigabit per second) is possible. Although advantageous from a data transfer perspective, such high data transfer rates can, and often, do overwhelm a host CPU. In fact, the processing in the TCP layer and IP layer can so occupy the CPU kernel, that in many cases, the kernel spends between 70 and 80 percent (or more) of the total CPU resources processing packets. Thus, little other data processing can be performed in the CPU. As a result, little processing power remains for the implementation of applications. This can drastically compromise system efficiency.

Conventionally employed computer systems commonly use one or more central processing units (CPU's) to conduct processing within a computer system. Commonly, such computer systems are configured to include a kernel layer and a user layer. As is known to those having ordinary skill in the art, the user layer includes a multiplicity of applications and programs which can receive information processed by the CPU at the kernel layer.

Additionally, computer systems can be interconnected in networked systems. Examples include, but are not limited, to local area networks (LAN's) and the much vaster Internet. Typically, such computer systems are connected to networks using network interface cards (NIC's) which are specially constructed pieces of hardware designed for such purposes.

Commonly, when a network message is received by a NIC it is decoded by the kernel layer in a series of steps and then sent to an end user (application) for processing and use. Although simple in conception this process can be quite involved. A typical network message includes a series of protocol headers (e.g., L1-L4) encapsulating a data package. The protocol headers enable the network message to negotiate the various system and network layers used to facilitate message traffic.

In one example, a message it transmitted to a local computer in accordance with a conventional process as commonly employed. A network message including message data is encapsulated with a series of headers. A data link layer (e.g., Ethernet, FDDI, or another data link header) encapsulates the message. Also, a transport layer header encapsulates the message. Such transport layer headers can include TCP (Transmission Control Protocol) headers. A network layer header also encapsulates the message. Such transport layer headers can include IP (Internet Protocol) headers and the like. Also, the message data is encapsulated by application layer protocol headers like NFS and HTTP headers. Before, the message data package can be transmitted to the end user (typically an application program operating in the user layer of a local computer system) the headers must be decoded and interpreted.

Typical networked computer systems are commonly configured as follows. The computer system includes an operating system (O/S) arranged to include a user layer and a kernel layer. The user layer is configured to operate the applications (i.e., software) stored on the computer. As is known to those having ordinary skill in the art the kernel is configured to execute a wide variety of processing tasks. The kernel layer includes a socket layer which interfaces the kernel layer with the applications in the user layer. Also, the kernel layer includes a driver layer that enables communication between the kernel layer and the NIC. Additionally, the kernel level includes a protocol stack used for decoding the various protocol headers used in the messages.

The computer system communicates with the network using the NIC that connects the computer system with a network. The NIC communicates with the operating system (O/S) via a NIC driver. Also, the NIC communicates with the driver using an I/O bus. Network messages are received at the NIC where they are stored in NIC memory. The messages are then copied (using a direct memory access (DMA) process) to a kernel buffer and decoded using the protocol stack of the kernel layer. The decoded messages are then copied to a final location in the user buffer in the user layer where they are processed by the appropriate applications. All of this processing is performed by the kernel and generates significant network processing overhead (time spent processing network messages). As network message traffic increases more and more CPU time is being devoted to processing network messages. Conversely, due to this increasing overhead, less and less CPU time is available to conduct processing of other operations. This has a significant impact on the usefulness of such computer systems.

The following example provides a brief exemplary overview of a conventional network message processing operation used for dealing with network messages in accordance with current processes. A network message is transmitted along a network where in accordance with network protocols it is directed to an appropriate local computer system. There it is received by a NIC associated with the local computer. The NIC stores the network message in a NIC memory until further processing is completed. This is something of a problem due to the small size of most NIC memory and also due to high amount of network traffic through the NIC (the volume of which is constantly increasing).

In order to avoid overflowing the NIC memory, once the NIC has received and stored the network message, the NIC sends the message to the kernel layer of the computer for processing. The network message is sent to a NIC driver via the I/O bus. This is another of the bottlenecks in current system and contributes substantially to network processing overhead. In order to communicate the network message to the kernel layer the message must be processed by the driver (in the kernel layer). In order to transfer the network message from the NIC to the kernel the message must be transmitted through a standard I/O bus. The difficulty is that such standardized I/O busses transmit data in a series of "packets" (also referred to as "frames") of 1500 bytes. These packets can be, for example, 1500 byte Ethernet packets. For longer messages, the overhead involved in sending streams of packets is considerable. Thus, it is slow to send packets to the kernel.

Additionally, once the network message is processed by the driver layer and the data link header (e.g., an Ethernet header) is split off and decoded by a data link layer the message is placed in a kernel buffer using a direct memory access (DMA) process. This has the advantage of freeing the NIC memory for additional messages. However, there is a trade-off involved here. About one third of all of the network overhead involved in processing a message from a NIC until it reaches its intended final user buffer (associated with the intended und use application) is incurred here. Thus DMA processing from the NIC to a kernel buffer is a very time intensive process.

Additionally, once a network message is DMA'ed to a kernel buffer, the various headers must be decoded. This process is commonly referred to a header processing. Typically, the kernel layer includes a series of header processing layers that enable the decoding of associated headers in the network message. For example, a transport layer is configured to decode transport headers (e.g., TCP headers and the like) and a network layer is configured to decode network headers (e.g., IP headers and the like). Additionally, an upper layer protocol (ULP) layer is provided to enable decoding of ULP headers (e.g., NFS headers and the like).

Once the headers have been decoded and the data package has been defined and its user (destination application) determined the socket layer again DMA's the data from the kernel buffer to a user buffer associated with the destination application. Thus, even more valuable CPU cycles are expended in this copy from kernel buffer to user buffer.

Performance analysis has determined that such DMA data copying accounts for 30-60% of the total network processing overhead. Thus, many approaches have been attempted to solve this problem. Reductions of these issues will have significant impact CPU availability and significantly increase the number of CPU cycles available for application processing.

One approach that has been used to reduce this the amount of overhead involved in header processing and copying is the introduction of the TCP Offload Engine (TOE) into a standard NIC. Such TOE capable NIC's include decoder hardware capable of conducting TCP and IP processing directly on the NIC. Thus, instead of using the software of the kernel layer to conduct TCP/IP processing the hardware of the TOE NIC conducts the processing. Not only is the burden of TCP/IP processing removed from the CPU, but the TOE NIC hardware performs such processing faster. This represents a significant improvement in the art. Thus, such TOE capable NIC's remove the burden of TCP/IP processing from the kernel. Moreover, message traffic between the TOE NIC and the driver is no longer limited to 1500 byte packets. Such TOE NIC's can use message-based communications to transfer greater amounts of data between the TOE NIC and the driver. This also reduces the overhead. Examples of such TCP Offload Engines and their application to network interface cards are known to those of ordinary skill. For example, reference is made to U.S. patent application Ser. No. 10/884,791 entitled: "System And Method For Conducting Fast Offloading Of A Connection Onto A Network Interface Card" filed on Jul. 1, 2004 which is hereby incorporated by reference.

Even with the improvements made possible with TOE NIC cards, the steadily increasing amounts of network traffic makes further reductions in network processing overhead advantageous. Others have tried to incorporate the ULP layer into a NIC in much the same way that was done for TCP/IP processing. Up to a point this approach can work. However, this approach suffers from a serious drawback. Because the ULP decoder is hard wired, a different NIC is required for each ULP used by the computer system. Moreover, there are many different kinds of ULP's with new ULP's being devised all the time. Thus, the practical implementations of such an approach are significant.

Additionally, no approaches have yet been devised that can overcome the difficulties presented by the copying of the message data from the kernel buffer to the user buffer. A host of problems known to those having ordinary skill in the art have required that the network message first be DMA'ed to the kernel buffer before being copied to a user buffer. This copying imposes significant overhead on network message processing. One problem in particular is imposed by the need to decode the ULP header before transferring a message. For example, applications commonly define messages at the application level and encapsulate them in a ULP dependent format. Due to fragmentation like disruption of messages IP datagrams carrying application level messages are not "self-identifiable" as to which ULP transactions they belong to. Consequently, when such messages are received they cannot be reassembled back into appropriate ULP messages without being ULP aware. Thus, network packets must be placed in network buffers first. Then, after complete network stack processing (decoding), commonly all the way until the ULP header, can the application data be correctly extracted and interpreted from the network packets and copied to the final destination (e.g., a user buffer).

Thus, for at least these reasons, as well as other reasons, there is a need in the art for alternative approaches for network message processing that can reduce the overhead in network message processing.

SUMMARY OF THE INVENTION

Broadly speaking, the invention relates to systems, methods, computer readable instructions, and apparatus for conducting direct data placement of a network message from a network interface card to a user buffer. The invention can be implemented in numerous ways, including systems, software modules, methods, or a computer program products as well as other implementations. Several embodiments of the invention are discussed below.

One embodiment of the invention is directed to a method for conducting direct data placement of network message data into a user buffer. Generally, the method involves receiving network delivered messages by a host computer having a NIC with a TCP Offload Engine (TOE). Such messages include protocol headers including a ULP header. A received message is stored in a memory of the NIC where the headers are stripped from the message and processed. A ULP handler of the local computer is invoked to process the ULP header of the network message. Using information obtained from the processed ULP header a suitable final memory location in a user buffer is identified and designated for saving the message data. Once the final memory location is designated the message data is directly placed from the NIC memory to the final memory location in the user buffer.

One method embodiment involves providing a local computer configured with a kernel layer and a user layer and including a NIC capable of performing TCP/IP processing of network delivered message data. The NIC configured to connect the local computer to a network. In accordance with the method, a message data is received at the NIC, the data includes a TCP payload including a data package and associated ULP (upper layer protocol) header and also includes other headers. The data is stored to a NIC memory and the headers are stripped from the network message and processed. Processing the ULP header involves invoking a ULP handler of the local computer and processing the ULP header therewith. Using processed ULP information a suitable final memory location identified in a user buffer of the local computer and designated for saving the data of the network message. The message data is then directly placed from the NIC memory to the designated memory location in the user buffer.

In another embodiment, the disclosure teaches a computer program product embodied in a computer readable media that includes code for accomplishing direct data placement of network message data into a user buffer of a local computer. The product includes computer program code instructions for receiving network delivered messages by a TOE capable NIC associated with the local computer. The messages can include a TCP payload having a data package and associated ULP header and other headers. The product includes computer program code instructions for storing the network message in a NIC memory and instructions for stripping the headers from the network message. Also, included are computer program code instructions for processing the ULP header of the network message with a ULP handler of the local computer. The product further includes instructions for using processed ULP header information to identify a suitable memory location in a user buffer and designate the memory location for saving network message data. The product includes instructions for directly writing the TCP payload from the NIC to the designated memory location in the user buffer.

In another embodiment, the principles of the present invention enable a computer system to execute direct data placement of message data to a user buffer in accordance with the principles of the invention. The computer system includes at least one CPU configured to include a user layer and a kernel layer. The computer system includes a network interface card (NIC) in communication with the CPU and with a network. The user layer of the CPU having applications and at least one user buffer. The kernel layer of the CPU includes a ULP layer and a ULP handler capable of processing ULP message headers contained in data messages received by the NIC. The NIC is configured to include a TCP offload engine enabling the offloading of TCP/IP processing from the kernel layer onto the NIC. The NIC also having a TCP/IP stack configured to enable TCP/IP processing of message data sent by and received by the NIC. The NIC further including a enabling the direct writing of the message data to a user buffer.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

It is to be understood that in the drawings like reference numerals designate like structural elements. Also, it is specifically pointed out that the depictions in the drawings are not necessarily to scale.

DETAILED DESCRIPTION OF THE INVENTION

The invention relates to techniques, systems, and methods for conducting direct data placement of data from a network interface card to a user buffer. Embodiments of the invention are discussed below. However, those skilled in the art will readily appreciate that the detailed description given herein with respect to these figures is for explanatory purposes as the invention extends beyond these limited embodiments.

Embodiments of the present invention include methods, computer readable instructions, systems, and apparatus for reducing the network processing overhead caused by conventional data copying processes used to process network data messages. Thus, embodiments of the invention present improved data message processing for transmitting data from a NIC to a user buffer in the user layer of a local computer. Embodiments of the invention accomplish this by accessing a ULP header of a data message while the message is still stored in a NIC memory. By accessing and decoding the ULP header, the local computer can determine an appropriate final destination in the user buffer for the data message. Importantly, this data message can then be directly placed from the NIC to the final user buffer without an intermediate step of being DMA'ed into a kernel buffer and then copied again into the user buffer as is the case for conventional processes.

As alluded to above, conventional network message processing includes a great deal of processing overhead. Heretofore, a number of approaches have been tried to reduce this overhead. None have proven entirely suitable. The present invention discloses and improved method for processing network message traffic.

Embodiments of the present invention address some of the difficulties presented by conventional network processing. In particular, embodiments of the invention directly place network message data from a network interface card into a final destination in a user buffer without an intermediate copying of the data to a kernel buffer.

In order to better illustrate some of the properties of the embodiments of the invention, reference is hereby made to FIGS. 1-3B and the supporting paragraphs.

Figure 1:
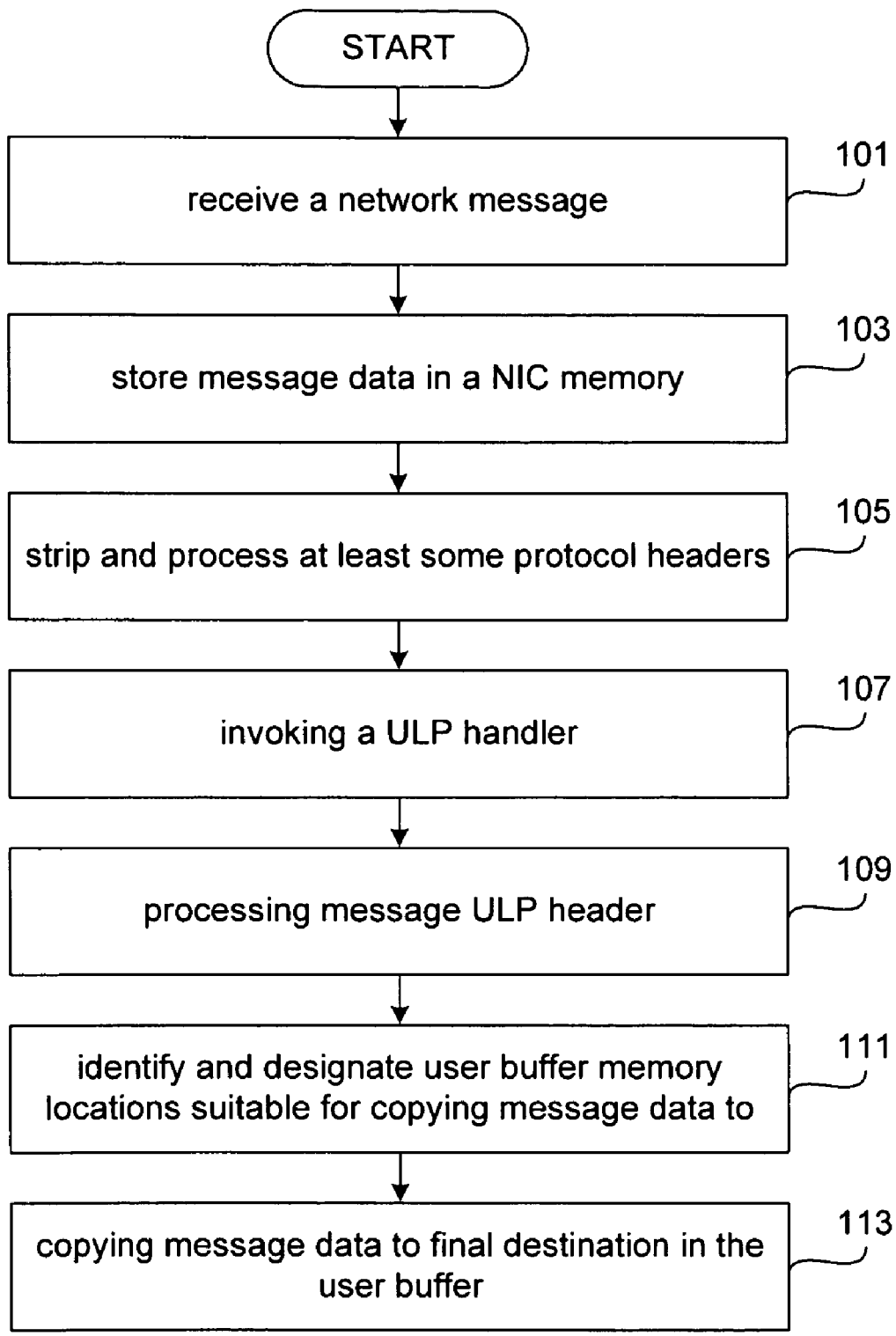
FIG. 1 is a flow diagram that describes one method embodiment for conducting direct data placement of network message data into a user buffer in accordance with one embodiment of the present invention.
Figure 2:
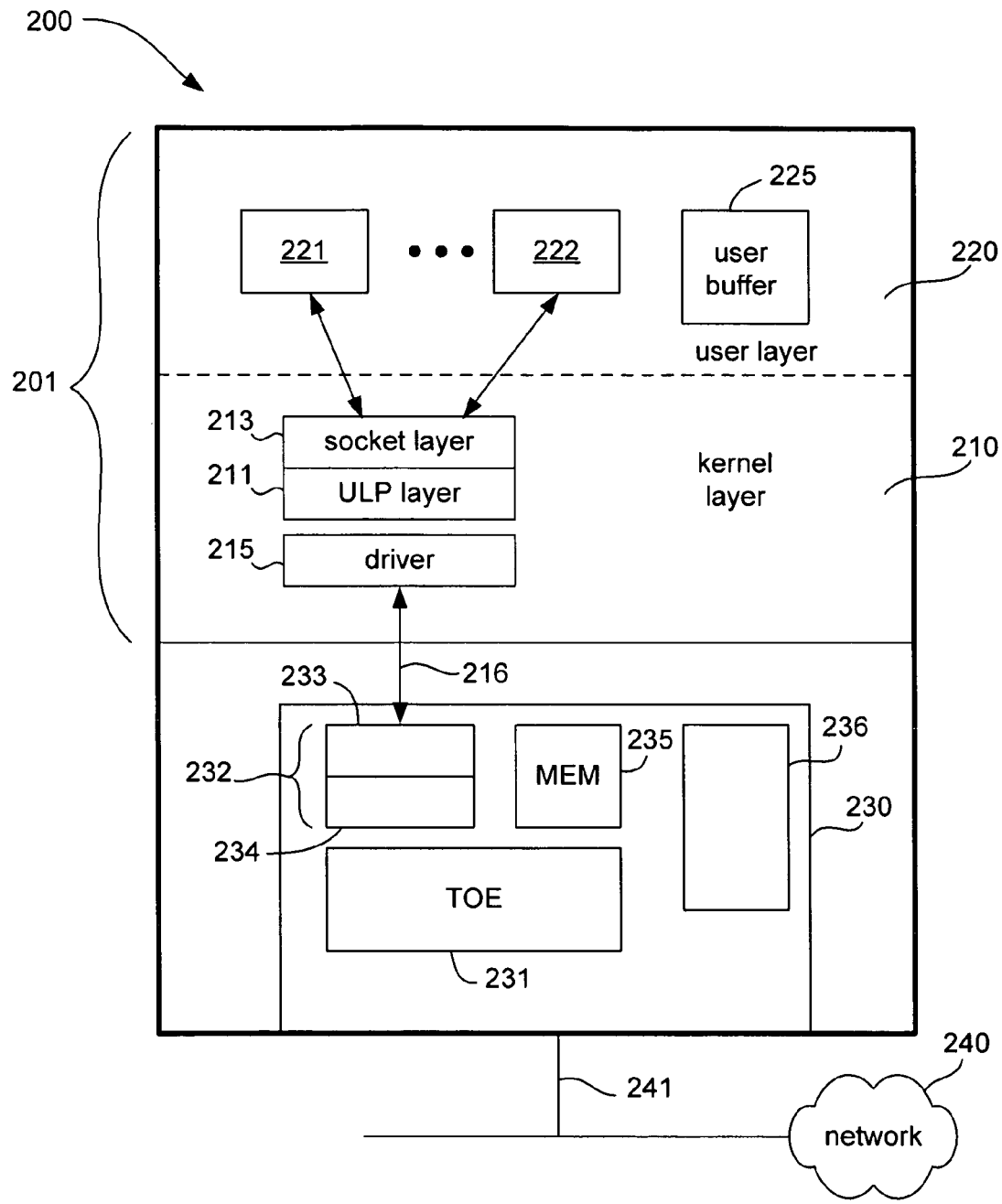
FIG. 2 depicts a computer system embodiment enabling the implementation of direct data placement of network message data into a user buffer in accordance with the principles of the invention.

FIG. 2 is a simplified flow diagram illustrating one embodiment for processing network message data in accordance with the principles of the invention. Network message processing begins with a data transmission message to or from a remote end point. A standard three-way handshake is used to establish a connection that allows a message stream comprising network messages to be sent between a local endpoint and the remote endpoint. As is known to those having ordinary skill in the art such handshakes are used to establish a connection between two uniquely identified endpoints (e.g., identified by a unique IP address and unique port identifier for each endpoint) and identify the message stream being sent. Thus, a connection identifies two endpoints configured to allow the exchange of data between the endpoints. Commonly, the connection is used to transmit a message stream. One example of a typical set of endpoints would be a client machine and a server machine. Alternatively, the two endpoints would be two computers connected via an Internet connection.

After the handshake, the kernel processes incoming and outgoing data in the connection to offload the connection onto a TOE capable NIC (i.e., a NIC capable of conducting TCP/IP processing of messages). Methods of achieving such TCP/IP offloading are known and one example is discussed conjunction with the previously referenced patent application Ser. No. 10/884,791 entitled: "System And Method For Conducting Fast Offloading Of A Connection Onto A Network Interface Card".

Once the connection is established network messages can be received (Step 101). Typically, such messages are standard format messages including a data packet encapsulated with a ULP header. This is sometimes referred to as the TCP packet. The TCP packet is encapsulated in a transport layer header (e.g., a TCP header) and a network layer header (e.g., an IP header). This is in turn encapsulated in a data link layer header (for example, an Ethernet header). Once a message is received it is stored in a memory of a network interface card (Step 103). Then at least some of the headers are stripped from the network message and processed (e.g., decoded) (Step 105). In one embodiment, the process is as follows. The Ethernet header is stripped and processed by the NIC. Because the invention uses a NIC having a TOE with an associated protocol stack, it is capable of conducting TCP/IP processing on the NIC. The TCP and IP headers are stripped from the network message and decoded by the NIC protocol stack in accordance with processing techniques known to those having ordinary skill in the art.

Before any further processing can be conducted on this or any related network messages the ULP header must be stripped and processed. Because there are so many possible ULP's and each ULP would require a separate NIC to perform ULP processing on the NIC a different solution is required. In accordance with the principles of the invention, the NIC invokes a ULP handler (which generally forms part of the ULP layer of the operating system) from the operating system (Step 107). The ULP handler then processes the ULP header of the message data stored in the NIC memory (Step 109). Such processing includes identifying the ULP header and stripping the ULP header from the rest of the message using the ULP handler and then decoding the ULP header. This processing provides information, for example, the file descriptor (identifying the intended end user (i.e. application) for the message data) and the length of the data message. This information can then be used to identify suitable memory locations in the user buffer for the message data. Once a suitable memory location in the user buffer has been identified, the identified location is designated for storing the data associated with that ULP header (Step 111). Thus far the only message information transferred from the NIC is the ULP header. Thus, a final memory address in the user buffer can be determined without the need to copy the entire message into the kernel buffer first. Moreover, only the ULP header need be read. Because only the ULP header need be read and processed the procedure is quick. Once a memory location is designated in the user buffer the message data in the NIC memory can by copied into the associated user buffer memory addresses (Step 113). In this way the message data is transferred to a final destination in a designated user buffer without undergoing an intermediate copy step into the kernel buffer where (in prior art implementations) it must wait until ULP processing is completed to identify a final memory location and then subsequently copied to the final memory location in the user buffer. Additionally, the next message in a series of messages can be processed in the same manner as described above.

Reference is now made to FIG. 2 which is a simplified figurative block diagram illustrating some elements of computer system embodiment constructed in accordance with the principles of the invention. The computer system 200 includes at least one central processing unit (CPU) configured to include operating system 201 with a kernel layer 210 and a user layer 220. The user layer 220 is configured similar to a conventional user layer having a multiplicity of applications (e.g., 221, . . . , 222, and so on)(e.g., application software programs) and a user buffer 225. The user buffer is a piece of specially configured memory that is dedicated for use with the user layer of an operating system. It is the final destination for most network messages intended for use with the applications 221, 222 of the computer system.

The operating system also includes the kernel layer which performs (among other tasks) significant amounts of applications processing. In conventional systems all message processing is performed by the kernel. In the depicted embodiment the protocol stack is reduced to the upper layer protocol (ULP) layer 211. The transport and network layers are no longer used in the protocol stack of the kernel layer. The ULP layer 211 includes software that can support at least one upper level protocol. For example, the ULP layer 211 can include an NFS protocol. As will be appreciated by those of ordinary skill many different protocols can also be implemented in the ULP layer 211. Typically, the ULP layer 211 includes a ULP handler that can be invoked to process ULP headers and decode ULP messages. The kernel layer 210 still includes a socket layer 213 for interfacing the kernel with the applications in the user layer. Commonly, a multiplicity of sockets in the socket layer are used to interface with corresponding applications in the user layer. Also, the kernel layer 210 includes a driver layer 215 that can interface with the ULP layer 211. The driver layer is also configured to communicate with a network interface card (NIC) 230 of the system. Additionally, because the kernel layer no longer includes a transport protocol layer or a network protocol layer, the driver layer 215 can use message-based communication (e.g., illustrated by 216) to communicate with the NIC 230 instead of the packet based communication used in conventional communication between NIC and driver. This significantly increases the rate of data transfer between the NIC and the operating system.

Also, the NIC 230 is in communication with a computer network 240. Thereby establishing communication between the operating system 201 and the network 240. Typically, such connection to the network is established using a network line 241. However, as is known to those having ordinary skill in the art, the connection between the NIC's and the network can be established using any of a number of modes (wireless, optical cable, telephone lines, and the like).

The NIC 230 includes a TCP Offload Engine (TOE) 231 and a protocol stack 232. Such a NIC 230 is also referred to herein as TOE capable NIC or a TOE NIC or sometimes as a TNIC. The protocol stack 232 typically includes a transport protocol layer 233 and a network protocol layer 234. Although depicted here as a TCP/IP stack 232, the inventors point out that the invention is not limited to such protocol stacks. However, in the depicted embodiment, the transport protocol layer 233 comprises a TCP protocol layer. Also, the network protocol layer 234 comprises an IP protocol layer. As stated above, the inventors point out that many other transport protocols (e.g., UDP and others) and network protocols (e.g., ICMP and others) can be used to practice the principles of the invention. The TOE 231 is configured to transfer transport protocol and network protocol processing (e.g., TCP/IP processing) from the CPU onto the NIC 230. Additionally, the TOE NIC 130 includes a memory 235 capable of storing network message data. The TOE NIC 230 also includes a direct data placement mechanism 236 capable of writing message data directly from the NIC memory 235 to a final destination in the user buffer 225 once the final destination is determined. The direct data placement mechanism 236 can be a hard-coded piece of electronic circuitry configured to write data from the memory 235 to the user buffer 225. Alternatively, the direct data placement mechanism 236 can be configured to execute a set of software instructions for writing data from the memory 235 to the user buffer 225. Using the teachings supplied herein, one of ordinary skill can construct numerous systems capable of implementing a direct write mechanism 236 as described.

Figure 3A:
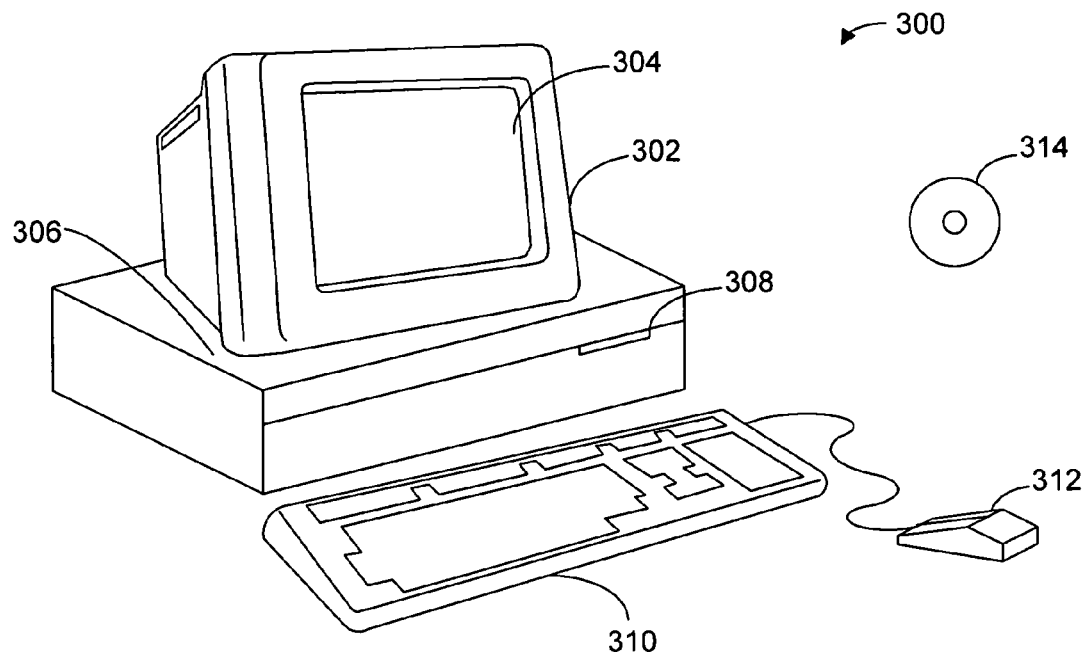
FIGS. 3A and 3B illustrate an example of a computer system that may be used in accordance with the invention.
Figure 3B:
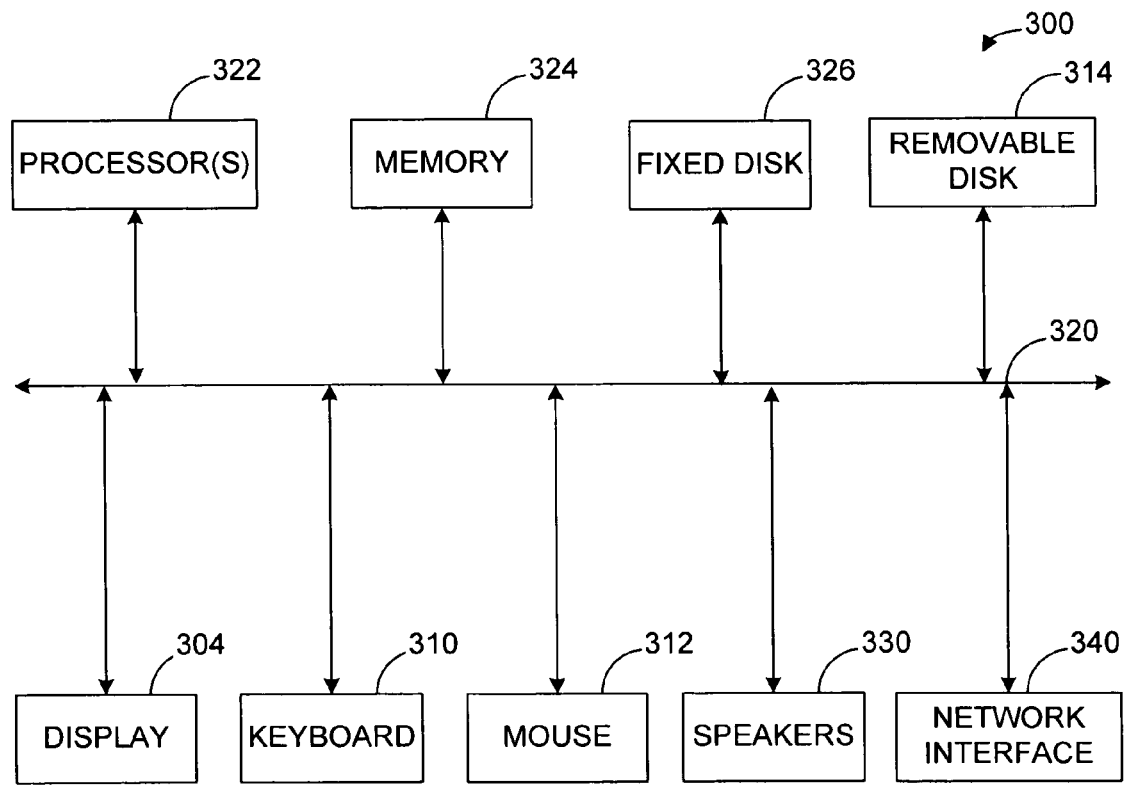

FIGS. 3A and 3B illustrate an example of a computer system 300 that may be used in accordance with the invention. FIG. 3A shows a computer system 300 that includes a display 302, screen 304, cabinet 306, keyboard 310, and mouse 312. Mouse 312 may have one or more buttons for interacting with a graphical user interface. Cabinet 306 can house a CD-ROM drive 308, system memory and a hard drive (see FIG. 3B) which may be utilized to store and retrieve software programs incorporating computer code that implements the invention, data for use with the invention, and the like. Although CD-ROM 308 is shown as an exemplary computer readable storage medium, other computer readable storage media including floppy disk, DVD, tape, memory sticks, flash memory, system memory, and hard drive may be utilized. Additionally, a data signal embodied in a carrier wave (e.g., in a network including the Internet) may be the computer readable storage medium. In one implementation, an operating system for the computer system 300 is provided in the system memory, the hard drive, the CD-ROM 308 or other computer readable storage medium and serves to incorporate the computer code that implements the invention. It is to be remembered that the operating system can be configured so it controls all of the processors of the system. It should be noted that other devices (e.g., printers, scanners, etc.) may be present in the computer system 300. Moreover, the inventors specifically point out that the principles of the present invention find advantageous implementation where the computer system 300 comprises a server type computer serving several other computers systems.

FIG. 3B shows a system block diagram of computer system 300 used to execute the software of an embodiment of the invention. The computer system 300 includes monitor 304, keyboard 310, and mouse 312. Computer system 300 further includes subsystems, such as a plurality of central processors (CPU's) 322 (including cache memory resources), system memory 324, fixed storage 326 (e.g., hard drive), removable storage 314 (e.g., CD-ROM drive), display adapter, sound card and speakers 330, and network interface 340. The network interface can be used to facilitate connection with many different network structures including the Internet. The central processors 351, for example, can execute computer program code (e.g., an operating system) to implement the invention. An operating system is normally (but not necessarily) resident in the system memory 324 during its execution. Other computer systems suitable for use with the invention may include additional or fewer subsystems. Importantly, the principles of the invention can specifically be implemented on networked computer systems having many individual computers. Such networked systems can include local area networks (LAN's) or a wide area network (WAN's). Particularly, the inventors contemplate computer systems and message traffic operating over the Internet. Additionally, an example of a LAN is a private network used by a mid-sized company with a building complex. Publicly accessible WAN's include the Internet, cellular telephone network, satellite systems and plain-old-telephone systems (POTS). Examples of private WAN's include those used by multinational corporations for their internal information system needs. The network may also be a combination of private and/or public LANs and/or WANs. The system bus architecture of computer system 300 is represented by arrows 320. However, these arrows are illustrative of any interconnection scheme serving to link the subsystems. For example, a local bus could be utilized to connect the central processor to the system memory and display adapter. Computer system 300 shown in FIG. 3B is but an example of a computer system suitable for use with the invention. Other computer architectures having different configurations of subsystems may also be utilized.

The invention can use a combination of hardware and software components. The software can be embodied as computer readable code (or computer program code) on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over a network coupled computer systems so that the computer readable code is stored and executed in a distributed fashion.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for accomplishing direct data placement of message data into a user buffer of a local computer for network message data received by a network interface card (NIC) associated with the local computer and connected to a network, the method comprising:
   receiving a network delivered message by a NIC associated with a local computer, wherein the network delivered message includes: a transport layer protocol header and a network layer protocol header and a TCP payload including a data packet and associated ULP (upper layer protocol) header and other headers, and wherein the NIC includes a TCP offload engine capable of processing the transport layer protocol header and the network layer protocol header of network delivered messages;
   storing the network delivered message in a NIC memory;
   stripping the headers from the network delivered message;
   invoking a ULP handler of the local computer to process the ULP header of the network message;
   processing the ULP header to identify and designate a suitable memory location in a user buffer of the local computer for saving the TCP payload; and
   directly writing the TCP payload from the NIC memory to the designated memory location in the user buffer.

2. The method of claim 1 wherein the network delivered message comprises an internet message.

3. A method as in claim 1 wherein the NIC includes a TCP offload engine capable of processing the transport layer protocol header and the network layer protocol header of network delivered messages.

4. A method as in claim 1 wherein the transport layer protocol header comprises a TCP header and wherein the network layer protocol header comprises an IP header and wherein the processing of the transport layer protocol header and the network layer protocol header comprises TCP processing and IP processing of network delivered messages.

5. A method as in claim 1 wherein the NIC includes a TCP offload engine capable of TCP processing and IP processing of network delivered messages without accessing the CPU of the local computer.

6. A method as in claim 1 wherein the other headers of the network message include at least a data link layer header.

7. A method as in claim 6 wherein the data link layer header comprises an Ethernet header.

8. A method as in claim 1 wherein the ULP header comprises one of an HTTP (hypertext transfer protocol) header and an NFS (network file system) header.

9. A method as in claim 1 wherein invoking a ULP handler of the local computer to process the ULP header of the network message includes decoding the ULP header to determine the length of the data packet and to determine an intended user of the data packet; and wherein processing the ULP header to identify and designate a suitable memory location comprises identifying available memory addresses in the user buffer of the local computer and selecting a suitable memory location from among the available memory addresses.

10. A computer readable medium comprising executable instructions for accomplishing direct data placement into a user buffer of a local computer for message data received by a TOE (TCP offload engine) capable NIC associated with the local computer and connected to a network, wherein executable instructions comprise instructions to:

receive a network delivered message by the TOE capable NIC associated with the local computer, wherein the message includes: a TCP payload including a data packet and associated ULP (upper layer protocol) header and other headers;

store the network message in a NIC memory;

strip the headers from the network message;

process the ULP header of the network message with a ULP handler of the local computer;

use processed ULP header information from the ULP handler to identify a suitable memory location in a user buffer of the local computer and designate the suitable memory location for saving the TCP payload; and write the TCP payload from the NIC to the designated memory location in the user buffer.

11. The computer readable medium of claim 10 wherein receiving the network delivered message comprises receiving an internet message.

12. The computer readable medium of claim 10 wherein receiving the network delivered message comprises receiving a local area network message.

13. The computer readable medium of claim 10 wherein processing the ULP header determines the length of the data packet and an intended user of the data packet; and wherein using processed ULP header information from the ULP handler to designate a memory location in a user buffer include determining available memory addresses in the user buffer and using the length of the data packet and the intended user of the data packet to determining a designated memory location in the user buffer for saving the TCP payload.

14. A computer system enabling direct data placement of message data to a user buffer, the computer system including at least one central processing unit (CPU) configured to include an user layer and a kernel layer;

the user layer having applications and at least one user buffer:

the kernel layer having a ULP layer operating in a CPU kernel and a ULP handler capable of processing ULP message headers contained in data messages received by the NIC;

a network interface card (NIC) in communication with the CPU and with a network, the NIC having:

an TCP offload engine enabling the offloading of TCP/IP processing from the kernel layer onto the NIC, a TCP/IP stack configured to enable TCP/IP processing of message data sent by and received by the NIC; and a direct data placement mechanism enabling the direct writing of the message data to a user buffer.

15. The computer system of claim 14 wherein the message data includes message data transmitted over the internet.

16. The computer system of claim 14 wherein the network interface card includes a mechanism for invoking the ULP handler to decode ULP message headers contained in data messages received by the network interface card.

* * * * *